United States Patent
Lee

(10) Patent No.: US 9,836,072 B2
(45) Date of Patent: Dec. 5, 2017

(54) DATA PROCESSING APPARATUS OF ENERGY MANAGEMENT SYSTEM

(71) Applicant: LSIS CO., LTD., Anyang-si, Gyeonggi-do (KR)

(72) Inventor: Seung Ju Lee, Ansan-si (KR)

(73) Assignee: LSIS CO., LTD., Anyang-si (KR)

( * ) Notice: Subject to any disclaimer, the term of this patent is extended or adjusted under 35 U.S.C. 154(b) by 312 days.

(21) Appl. No.: 14/643,946

(22) Filed: Mar. 10, 2015

(65) Prior Publication Data
US 2015/0268685 A1 Sep. 24, 2015

(30) Foreign Application Priority Data
Mar. 20, 2014 (KR) .......................... 10-2014-0032703

(51) Int. Cl.
| G08B 21/00 | (2006.01) |
|---|---|
| G05F 1/66 | (2006.01) |
| G06Q 50/06 | (2012.01) |
| G05B 15/02 | (2006.01) |

(52) U.S. Cl.
CPC ............... *G05F 1/66* (2013.01); *G05B 15/02* (2013.01); *G06Q 50/06* (2013.01)

(58) Field of Classification Search
CPC .................................. G05F 1/66; G05B 15/02
USPC ..... 340/540, 3.1, 5.1, 6.1, 7.32; 702/61, 179
See application file for complete search history.

(56) References Cited

U.S. PATENT DOCUMENTS

| 6,178,362 B1 * | 1/2001 | Woolard ................. G01R 22/00 700/28 |
| 8,788,097 B2 * | 7/2014 | Drees ..................... G05B 15/02 700/275 |
| 9,286,582 B2 * | 3/2016 | Drees ..................... G06Q 10/06 |
| 9,429,927 B2 * | 8/2016 | Nesler ................. G01R 21/133 |
| 2007/0038394 A1 | 2/2007 | Gagnon et al. |
| 2008/0262820 A1 * | 10/2008 | Nasle ..................... G06Q 10/04 703/18 |
| 2009/0076749 A1 | 3/2009 | Nasle |

FOREIGN PATENT DOCUMENTS

| JP | 2002-358118 | 12/2002 |
| JP | 2010-110040 | 5/2010 |
| JP | 2012-125065 | 6/2012 |
| KR | 10-2009-0046543 | 5/2009 |
| KR | 10-2012-0137623 | 12/2012 |
| KR | 10-2013-0099507 | 9/2013 |
| KR | 10-2013-0114159 | 10/2013 |

OTHER PUBLICATIONS

Korean Intellectual Property Office Application Serial No. 10-2014-0032703, Office Action dated Feb. 13, 2015, 5 pages.
European Patent Office Application Serial No. 15159540.2, Search Report dated Aug. 4, 2015, 6 pages.

* cited by examiner

*Primary Examiner* — Toan N Pham
(74) *Attorney, Agent, or Firm* — Lee, Hong, Degerman, Kang & Waimey

(57) ABSTRACT

An apparatus for data processing in an energy management system is provided. The apparatus includes an operation and management unit collecting data obtained by measuring a target, storing a limit information table including at least one limit set determining whether to output an alarm for collected data, and outputting the alarm for the collected data based on the limit information table; and a history management unit storing history information on the operation and management unit.

13 Claims, 4 Drawing Sheets

DATA PROCESSING APPARATUS OF ENERGY MANAGEMENT SYSTEM

CROSS-REFERENCE TO RELATED APPLICATIONS

Pursuant to 35 U.S.C. §119(a), this application claims the benefit of earlier filing date and right of priority to Korean Patent Application No. 10-2014-0032703, filed on Mar. 20, 2014, the contents of which are hereby incorporated by reference herein in its entirety.

BACKGROUND

The present disclosure relates to a data processing apparatus of an energy management system.

A typical energy management system may perform management and monitoring on the state of energy by material collection or material link to a broad power system. An alarm typically provided to be utilized for monitoring the operation state of a power system is an operation for recognizing a change in the operation state when there is simply the change. The alarm for event occurrence corresponding to such a simple condition undiscriminatingly generates an alarm signal even for a change in operation state occurring continuously/repetitively or by a control signal from a user. Also, an alarm server processing the alarm event may include alarm event data received from a data processing apparatus in a queue, perform an operation corresponding to an alarm type and output corresponding alarm data. That is, the alarm server searches for a data alarm condition limited to a preset state and raises the alarm when there is matching data. In this case, alarm processing on a data change matching a change in various environment conditions or a change in time condition is difficult.

That is, by generating alarm data corresponding to a unilateral alarm condition that does not cope with various changes in data collection and alarm, it is possible to output an undiscriminating or slow alarm that does not match an alarm condition to be recognized by a user.

SUMMARY

Embodiments provide a data processing apparatus that may store an alarm condition matching environment and time condition information with respect to data collected from an energy management system and provide corresponding variable data state information.

In one embodiment, a data processing apparatus includes an operation and management unit configured to collect data obtained by measuring a target, storing a limit information table, the limit information table including at least one limit set that determines whether to output an alarm for collected data, and outputting the alarm for the collected data based on the limit information table; and a history management unit configured to store history information on the operation and management unit.

The details of one or more embodiments are set forth in the accompanying drawings and the description below. Other features will be apparent from the description and drawings, and from the claims.

DETAILED DESCRIPTION OF THE EMBODIMENTS

An energy management system (EMS) according to an embodiment includes an operation and management unit collecting data obtained by measuring a target, storing a limit information table including at least one limit set determining whether to output an alarm for collected data, and outputting the alarm for the collected data based on the limit information table; and a history management unit storing history information on the operation and management unit.

In an EMS according to another embodiment, the operation and management unit includes a real-time management unit collecting collected data, checking whether the limit set included in a preset limit information table is changed, checking whether there is data matching the limit set and outputting an alarm for corresponding data.

In an EMS according to still another embodiment, the operation and management unit further includes a file storage unit storing information on at least one limit set determining whether to output the alarm for the collected data.

In an EMS according to still another embodiment, the file storage unit stores a plural limit set including information on a plural limit set.

In an EMS according to still another embodiment, the limit information table is created in plurality according to whether the limit set is included.

In an EMS according to still another embodiment, the limit information table includes identifier information on each limit set.

In an EMS according to still another embodiment, the limit set included in the limit information table includes an upper or lower value of data.

In an EMS according to still another embodiment, the operation management unit outputs an alarm when there is a value beyond a range between the upper and lower values of the data.

In an EMS according to still another embodiment, the limit set included in the limit information table includes a type of alarm for data.

In an EMS according to still another embodiment, the limit set included in the limit information table includes an initial setting of data.

In an EMS according to still another embodiment, the operation and management unit stores, in the file storage unit, update information on at least one limit set included in the limit information table.

In an EMS according to still another embodiment, the operation and management unit checks changed limit set information at every update period for the limit set and raises an alarm for a change event when it is sensed that the limit set information is changed.

In an EMS according to still another embodiment, the operation and management unit checks changed limit set information at every update period for the limit set and reads a limit condition set for the limit set when it is not sensed that the limit set information is changed.

Embodiments are described below in detail with reference to the accompanying drawings.

Figure 1:
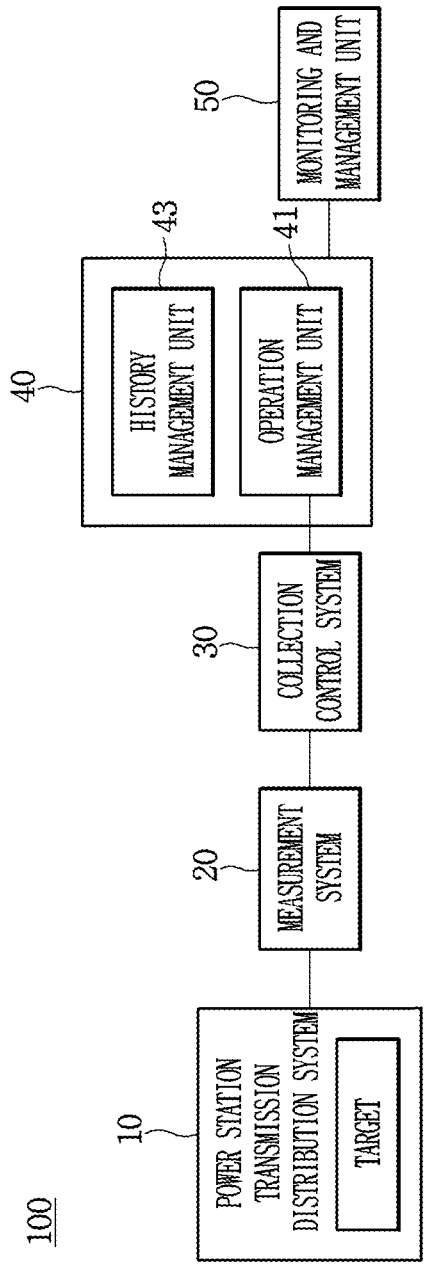
FIG. 1 is a block diagram of an energy management system (EMS) according to an embodiment.

FIG. 1 is a block diagram of an energy management system (EMS) according to an embodiment.

Referring to FIG. 1, an EMS 100 according to an embodiment may include a target 10, a measurement system 20, a collection control system 30, a data processing apparatus 40, and a monitoring and management system 50.

The target 10 may include a power station producing electricity, a power transmission/distribution system that transmits produced electricity to a customer, and a customer load system.

The measurement system 20 may transmit, measurement information such as a current or voltage or a modem signal such as a remote terminal unit (RTU) in a power system, to the collection control system 30 that is located in a short distance or long distance, through an analog, digital or pulse sensor in a power generation or system process.

The collection control system 30 may collect various pieces of field information, collect various signals transmitted from the field, convert collected signals into engineering information to convert the information into actual values, and control the information to calculate new field transmission information. The data may be transmitted to the data processing apparatus 40 through a network.

The data processing apparatus 40 manages various pieces of data or information according to usage. The data processing apparatus 40 may include an operation and management unit 41 and a history management unit 43. A management program operating the configuration, a field-dedicated application program, a default program for monitoring may operate. In particular, the data processing apparatus 40 according to an embodiment may perform alarm processing on data transmitted from the collection control system 30. The alarm processing may be performed according to whether conditions on a plural limit set including an alarm limit and on a plurality of sets are matched.

The operation and management unit 41 may store information on a plurality of conditions for alarm processing on collected data and determine based on the information on the conditions whether to output an alarm for data.

The history management unit 43 may store information on a data processing history and alarm output history processed by the operation and management unit 41 with respect to collected data. Also, it is possible for the history management unit 43 to store whether to change limit information for an alarm output according to an embodiment, and information on an event notification according to the change.

The monitoring and management system 50 may include various function units that may monitor or control information. The monitoring and management system 50 transmits a control command input by an operator to the target 10 through the data processing apparatus 40 and the collection control system 30 to operate a pre-determined measurement and control device.

Figure 2:
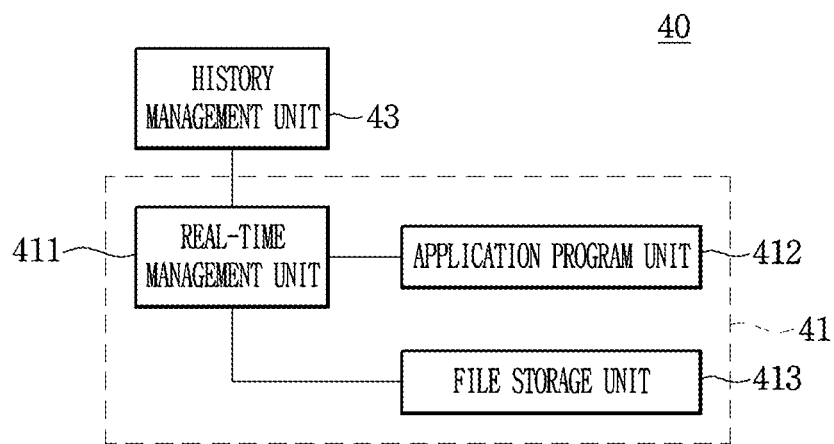
FIG. 2 is a block diagram of a data processing apparatus of an EMS according to an embodiment.
Figure 3:
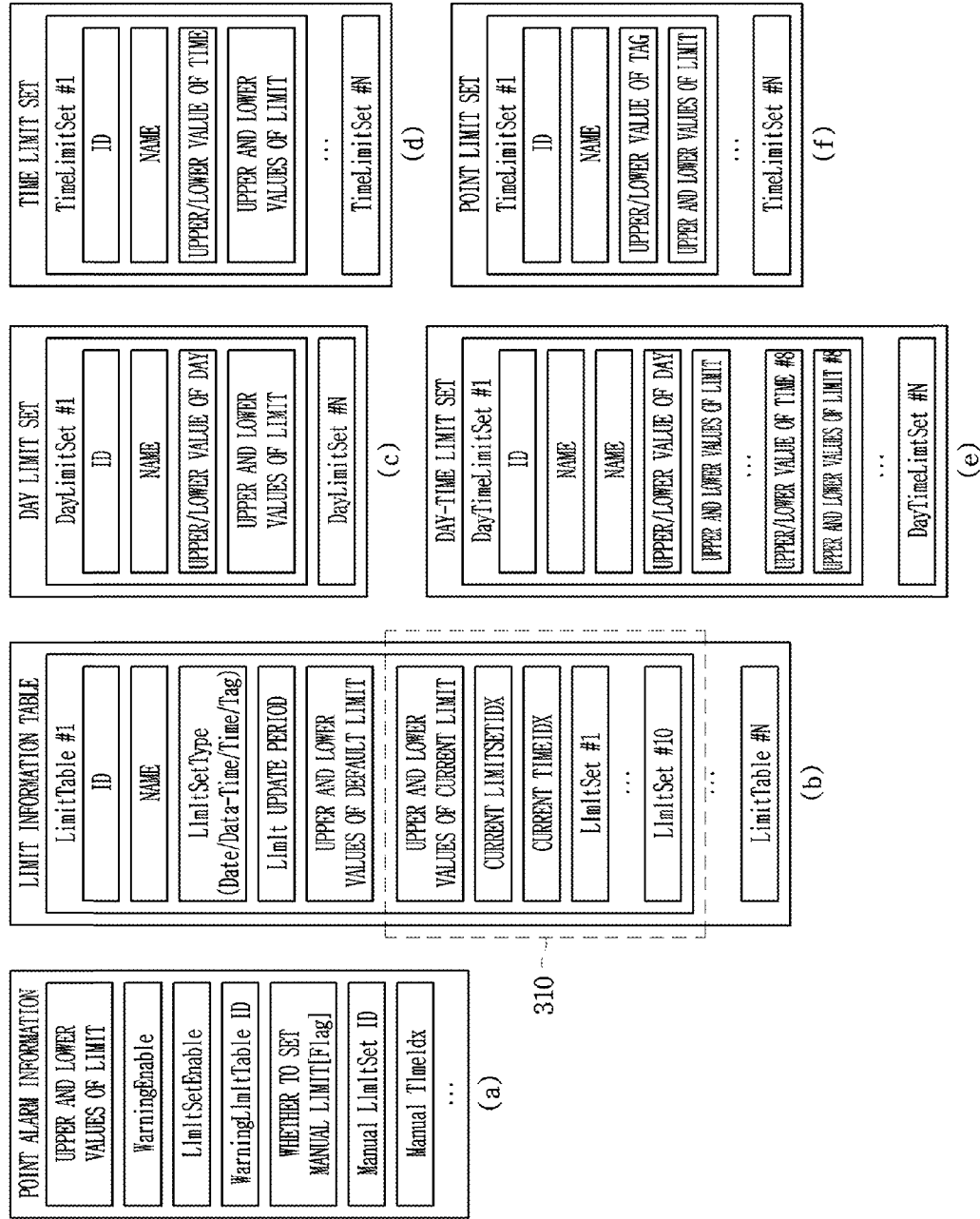
FIG. 3 is an exemplary diagram for explaining a group of data alarm limits according to an embodiment.

FIG. 2 is a block diagram of a data processing apparatus of an EMS according to an embodiment, and FIG. 3 is an exemplary diagram for explaining a group of data alarm limits according to an embodiment.

Referring to FIGS. 2 and 3, the operation and management unit 41 of the data processing apparatus 40 according to an embodiment may include a real-time management unit 411, an application program unit 412, and a file storage unit 413.

The real-time management unit 411 may perform check and alarm processing on collected data based on an alarm limit setting state and information according to an embodiment.

The application program unit 412 may store various programs for providing data collection and alarm processing state information according to an embodiment. The application program unit 412 may store various processing programs for processing various pieces of data such as image, text or audio data or for performing following processing.

The file storage unit 413 may store condition information for alarm processing on collected data according to an embodiment. It is possible for the file storage unit 413 to store alarm processing condition information by setting an alarm condition based on a environment and time state and receiving corresponding detailed information. Also, the file storage unit 413 may create and store a group of alarm conditions that includes a plurality of alarm conditions.

The alarm condition information stored in the file storage unit 413 may include groups having dependency as shown in FIG. 3.

The data alarm condition stored in the file storage unit 413 may be obtained by storing alarm information on collected data in a tabular form as shown in FIG. 3a. It is possible to include information on the upper and lower values of an alarm limit of collected data, and information on the type of an alarm (caution, warning, and danger) and an initial data setting. Alarm information (in FIG. 3a) may be obtained by storing limit information including various environments and time condition information for outputting an alarm in a table (in FIG. 3b) form according to an embodiment.

A limit information table (in FIG. 3b) may include at least one limit set 310.

The limit information table (in FIG. 3b) may be created in plurality, the table having each ID. It is possible to process an alarm on collected data by a combination of sets of various limits included in the limit information table (in FIG. 13b).

The limit information table (in FIG. 13b) may include a limit set including at least one of e.g., weather, time and point conditions, have corresponding identifier information (ID) and determine an alarm condition on the collected data by using the identifier information. The identifier information may be set in the form that it is possible to recognize the type and state of a limit set included in the limit information table.

The limit information table (in FIG. 13b) may include update time information on the limit set included. Also, the limit information table may store condition information (the upper limit or lower limit of an alarm output condition data value) for alarm processing on collected data when the limit set is not included.

At least one limit set included in the limit information table may include information on an upper limit and a lower limit for each alarm output, and a limit set included in a piece of identifier information may determine whether to output data alarm, by one or more of "and" and "or" conditions.

The limit set according to an embodiment may include reference information on the upper and lower limits of data collected on a corresponding date based on date information in collected data and include a day limit set (in FIG. 3c) enabling an alarm for data beyond a reference information range.

Alternatively, it is possible to include, based on collected time information, reference information on the upper and lower limits of data collected at a corresponding time and include a time limit set (in FIG. 3d) enabling an alarm for data beyond the reference information range.

Alternatively, it is possible to include a plural limit set and include a plural limit set (in FIG. 3e) enabling an alarm when data matching all or any one of conditions on the plural limit set is sensed.

Alternatively, it is possible to include, based on a specific point, reference information on the upper and lower limits of data collected at a corresponding point, and include a point limit set (in FIG. 3f) enabling an alarm for data beyond a reference information range.

In an embodiment as described above, it is possible to create a limit information table including at least one limit set with respect to collected data and determine whether to perform alarm processing on collected data based on the limit information table.

A data processing operation according to an embodiment is described below in detail with reference to FIG. 4.

Figure 4:
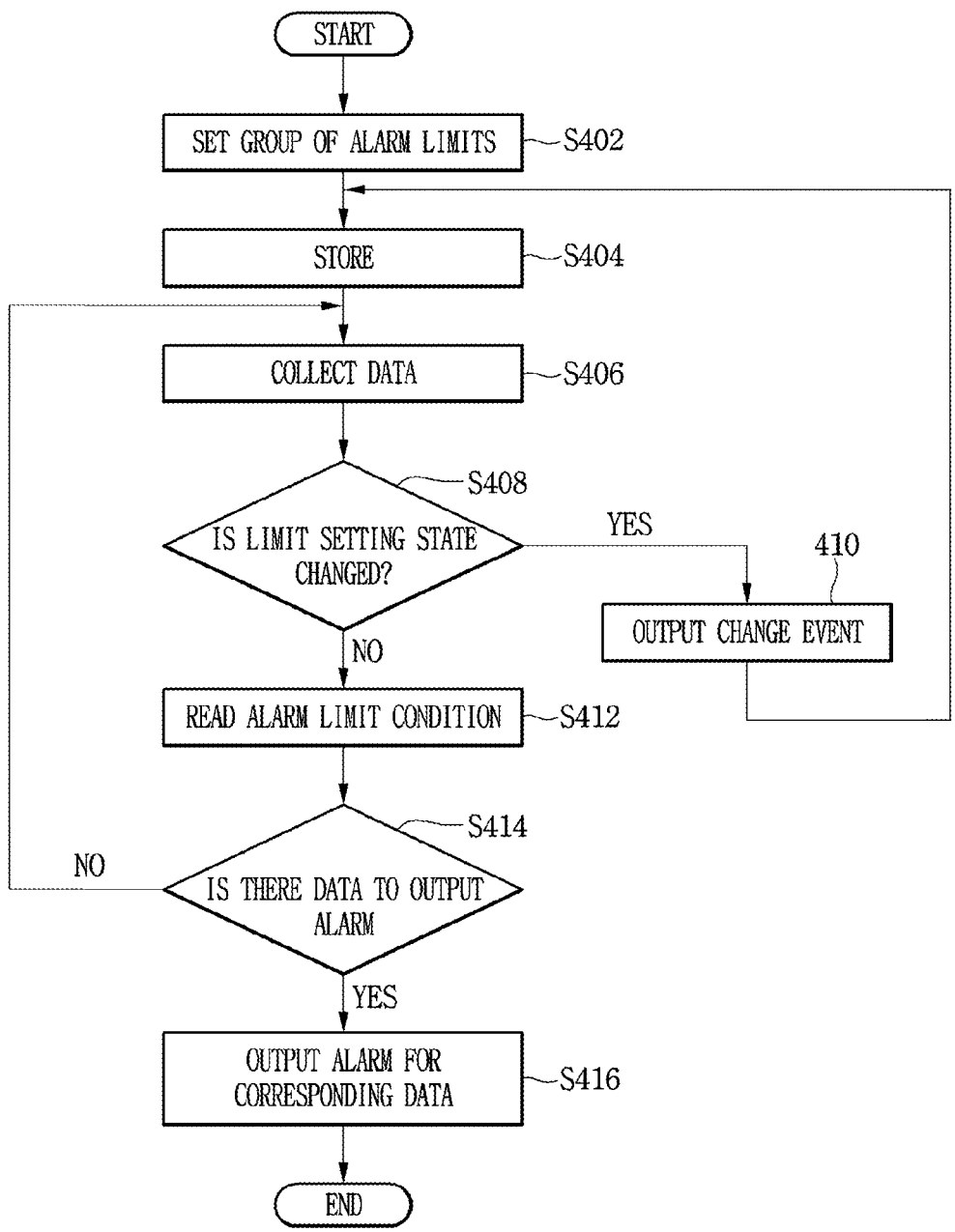
FIG. 4 is a flowchart of a data processing operation according to an embodiment.

FIG. 4 is a flowchart of a data processing operation according to an embodiment.

Referring to FIG. 4, the data processing apparatus 40 according to an embodiment may receive at least one alarm limit set for outputting an alarm for collected data to set a group of alarm limits in step S402. The group of alarm limits may include a single limit set or a plural limit set. Also, when the limit set is not included, it is possible to set default limit information (information on one or more of the upper and lower values of a limit) on collected data.

The data processing apparatus 40 may store a setting state on a set alarm limit set into the file storage unit 413 in step S404.

The data processing apparatus 40 may collect data in a state in which the alarm limit set is set in step S406.

The data processing apparatus 40 may continuously determine whether a preset limit setting state is changed during data collection. When it is sensed that the limit setting state has been changed, the data processing apparatus 40 may create a limit setting state change event and update a limit setting state on collected data based on a created event.

On the contrary, when it is not sensed that the limit setting state has been changed during data collection, the data processing apparatus 40 may read a limit condition set for a limit set to be applied to collected data, in step S412.

The data processing apparatus 40 may determine, on collected data, whether there is data matching an alarm limit condition in step S414, and output an alarm for corresponding data when there is the data matching the alarm condition ins step S416. The information on whether the alarm has been output and the limit setting state has been changed may be stored into the history management unit 43.

Embodiments may consider various environment and time conditions collecting data according to an apparatus for data processing in an EMS and process a corresponding variable data alarm to enable efficient data management and provide a reliable data alarm to a user.

The above descriptions are only examples of the technical spirit of embodiments, so a person skilled in the art may implement various modifications and variations without departing from the spirit and scope of the embodiments.

Thus, embodiments disclosed herein are intended not to limit but to describe the technical spirit of the present invention and the scope of the technical spirit of the present invention is not limited to such embodiments.

The protective scope of embodiments is defined by the appended claims, and all technical spirits within the equivalent scope are construed as being included in the scope of the right of the embodiments.

What is claimed is:

1. A data processing apparatus comprising:
an operation and management unit configured to:
set at least one condition for alarm processing, the at least one condition comprising at least one limit that is set according to types of data and that includes a value different from each of the other at least one limit,
obtain data by measuring a target; and
output the alarm if any of the obtained data matches the at least one condition; and
a storage unit configured to store history information related to the operation and management unit.

2. The apparatus according to claim 1, wherein the operation and management unit comprises a real-time management unit configured to:
obtain the data;
determine whether the limit is changed;
determine if any of the obtained data matches the at least one limit; and
output the alarm corresponding to the obtained data determined to match the at least one limit.

3. The apparatus according to claim 2, wherein the operation and management unit further comprises a file storage unit configured to store information related to the at least one limit.

4. The data processing apparatus according to claim 3, wherein the real-time management unit is further configured to store a plurality of limits in the file storage unit.

5. The data processing apparatus according to claim 3, wherein the real-time management unit is further configured to store the at least one condition in the file storage unit as at least one table that includes the at least one limit.

6. The data processing apparatus according to claim 5, wherein the at least one table comprises identifier information related to each the at least one limit.

7. The data processing apparatus according to claim 5, wherein each of the at least one limit has a range with an upper and lower value.

8. The data processing apparatus according to claim 7, wherein the operation and management unit is further configured to output the alarm when any of the obtained data has a value outside the range.

9. The data processing apparatus according to claim 5, wherein each of the at least one limit comprises a corresponding type of alarm.

10. The data processing apparatus according to claim 5, wherein each of the at least one limit comprises an initial setting.

11. The data processing apparatus according to claim 5, wherein the operation and management unit is further configured to store update information related to one or more of the at least one limit in the at least one table.

12. The data processing apparatus according to claim 1, wherein the operation and management unit is further configured to:
check for changed limit information according to an update period for each of the at least one limit; and
output the alarm when it is determined that there is changed limit information.

13. The data processing apparatus according to claim 1, wherein the operation and management unit is further configured to:
check for changed limit information according to an update period for each of the at least one limit; and
reads a condition set for a limit for which the corresponding limit information is changed.

* * * * *